US012151272B2

(12) United States Patent
Kim et al.

(10) Patent No.: US 12,151,272 B2
(45) Date of Patent: Nov. 26, 2024

(54) DUCT CUTTING-AND-FORMING DEVICE FOR ELBOW DUCT MANUFACTURING DEVICE

(71) Applicants: Ok Tae Kim, Yongin-si (KR); Ki Tae Kim, Hwaseong-si (KR); Sung Keun Noh, Suwon-si (KR)

(72) Inventors: Ok Tae Kim, Yongin-si (KR); Ki Tae Kim, Hwaseong-si (KR); Sung Keun Noh, Suwon-si (KR)

( * ) Notice: Subject to any disclaimer, the term of this patent is extended or adjusted under 35 U.S.C. 154(b) by 476 days.

(21) Appl. No.: 17/625,778

(22) PCT Filed: Jun. 2, 2020

(86) PCT No.: PCT/KR2020/007116
§ 371 (c)(1),
(2) Date: Jan. 10, 2022

(87) PCT Pub. No.: WO2021/006483
PCT Pub. Date: Jan. 14, 2021

(65) Prior Publication Data
US 2022/0274147 A1   Sep. 1, 2022

(30) Foreign Application Priority Data
Jul. 10, 2019   (KR) .................. 10-2019-0083242

(51) Int. Cl.
*B21C 37/12* (2006.01)
*B23D 21/14* (2006.01)
*B26D 3/16* (2006.01)

(52) U.S. Cl.
CPC ............ *B21C 37/125* (2013.01); *B23D 21/14* (2013.01); *B26D 3/16* (2013.01); *B26D 3/162* (2013.01)

(58) Field of Classification Search
CPC ....... B21C 37/125; B21C 37/30; B23D 21/14; B26D 3/162; B26D 3/163; B26D 3/16
See application file for complete search history.

(56) References Cited

U.S. PATENT DOCUMENTS

| 4,378,934 A | 4/1983 | Tucker |
| 7,096,585 B2 | 8/2006 | Bota |
| (Continued) | | |

FOREIGN PATENT DOCUMENTS

| JP | 05-177600 | 10/1993 |
| KR | 10-1128336 | 3/2012 |
| (Continued) | | |

OTHER PUBLICATIONS

KR20180086879A, Hwang et al. Aug. 2018.*
(Continued)

*Primary Examiner* — Edward T Tolan

(57) ABSTRACT

The present disclosure relates to a duct cutting and forming apparatus for elbow duct manufacturing machine, the apparatus including a rotation housing that is provided with a seating groove in a first direction; an eccentric housing that is provided with a cutting roller and a forming roller at both ends, and that is slidably seated inside the seating groove; a rotation drive for applying rotation driving force to the rotation housing; and an eccentric drive for applying driving force for reciprocating the eccentric housing, wherein the eccentric drive reciprocates the eccentric housing as it rotates in both directions within a range not exceeding 180 degrees.

7 Claims, 8 Drawing Sheets

(56) References Cited

U.S. PATENT DOCUMENTS

| | | | |
|---|---|---|---|
| 11,571,830 B2 * | 2/2023 | Bota | B26D 1/225 |
| 2004/0244559 A1 * | 12/2004 | Huang | B26D 1/285 |
| | | | 83/688 |
| 2005/0072203 A1 | 4/2005 | Ricck et al. | |
| 2011/0107601 A1 * | 5/2011 | Crainich | B26D 3/16 |
| | | | 83/13 |
| 2014/0259601 A1 | 9/2014 | Bota | |
| 2016/0114368 A1 | 4/2016 | Rieck | |
| 2017/0320119 A1 | 11/2017 | Noh | |

FOREIGN PATENT DOCUMENTS

| KR | 10-2016-0034581 | 3/2016 |
|---|---|---|
| KR | 10-2054442 | 12/2019 |

OTHER PUBLICATIONS

International Search Report and the Written Opinion Dated Sep. 25, 2020 From the International Searching Authority Re. Application No. PCT/KR2020/007116 and Its Translation Into English. (11 Pages).

Supplementary European Search Report Dated Jul. 20, 2022 From the European Patent Office Re. Application No. 20837510.5. (5 Pages).

* cited by examiner

DUCT CUTTING-AND-FORMING DEVICE FOR ELBOW DUCT MANUFACTURING DEVICE

RELATED APPLICATIONS

This application is a National Phase of PCT Patent Application No. PCT/KR2020/007116 having International filing date of Jun. 2, 2020, which claims the benefit of priority of Korea Patent Application No. 10-2019-0083242 filed on Jul. 10, 2019. The contents of the above applications are all incorporated by reference as if fully set forth herein in their entirety.

FIELD AND BACKGROUND OF THE INVENTION

The present disclosure relates to a duct cutting and forming apparatus for elbow duct manufacturing machine, and more particularly, to a duct cutting and forming apparatus for elbow duct manufacturing machine, that is capable of improving the quality of cutting a duct and of forming a duct wing while shortening the processing time.

In general, a duct refers to a part of a configuration of air-conditioning facility, that is an air cylinder made as a duct connection for the purpose of ventilation and circulation of air, in order to protect the respiratory systems of users who use public facilities, residences, and multiple purpose facilities such as underground shopping malls, from indoor pollutants such as fine dust, carbon dioxide and harmful bacteria.

As convenience and design are being considered into the structures of such facilities, causing the structures to become more and more complicated and diversified, the structure of the duct is also becoming more and more complicated and diversified.

Due to such complicated structure of the facilities, each duct manufacturer is manufacturing various types of ducts such as circular-type ducts, T-type ducts, Y-type ducts and elbow-types, in consideration of the purpose of use, location of use, and size of the duct.

Patent literature 1 (Korean Publication Gazette No. 10-1616041) relates to an equipment for manufacturing an elbow-type duct, that is composed of a main body, a moving guide part, a duct wing forming part, a duct wing coupling part and a rotation driving part. It is disclosed that this equipment is capable of cutting a cylindrical duct according to the shape of an elbow, and at the same time, forming duct wings, and then joining the duct wings of either side to each other, thereby manufacturing the elbow-type duct.

Such a prior art elbow-type duct manufacturing equipment is configured to have a rotation drive of a main shaft for extrusion and restoration of a cutting roller and a forming roller, and a rotation drive of a rotation housing for moving the area to be cut and formed, wherein both rotation drives operate by the power received from one power source.

Here, the production speed of a product is determined by the rotation speed of the rotation housing, and the product cutting and forming quality are determined by the extrusion speed of the cutting roller and the forming roller, wherein there is a problem in that increasing the rotation speed of the rotation housing in order to improve the production speed will increase the extrusion speed of the cutting roller and the forming roller, thereby deteriorating the cutting and forming quality, whereas reducing the extrusion speed of the cutting roller and the forming roller in order to improve the cutting and forming quality will deteriorate the production speed.

In addition, the extrusion and restoration of the prior art cutting roller and the forming roller are made by a 360 degrees rotation of the main shaft that is provided with an eccentric projection. More specifically, in the 0 to 90 degrees rotation area of the main shaft, the cutting roller extrudes, in the 90 to 180 degrees rotation area, the cutting roller is restored, and in the 180 to 270 degrees rotation area, the forming roller extrudes, and in the 270 to 360 degrees rotation area, the forming roller is restored.

Here, in prior art, since the extrusion length of the cutting roller and the forming roller cannot be adjusted, in order to secure the production yield of a product, the extrusion length of the cutting roller and the forming roller are set to be longer than necessary, that is, to be over stroke. Thus, the length of extrusion and restoration of the cutting roller and the forming roller would increase, resulting in the actual rotation area required for cutting and forming having the range of 0 to 70 degrees and 180 to 250 degrees, and the rotation area of the remaining 70 to 180 degrees and 250 to 260 degrees becoming the rotation area for over stroke and restoration.

That is, the rotation speed of the rotation housing, that determines the production speed of the product must be determined according to the rotation speed of the main shaft for extrusion and restoration of the cutting roller and the forming roller, but there occurs a problem that as unnecessary rotation areas of the main shaft increases due to the setting of the over stroke, not only does the production speed of the product deteriorate, but even though the production speed can be increased by reducing the restoration speed of the cutting roller and the forming speed, the production speed cannot be increased since the restoration speed of the cutting roller and the forming roller will become equivalent to the extrusion speed.

SUMMARY OF THE INVENTION

Therefore, a purpose of the present disclosure is to resolve such problems of prior art, that is, to provide a duct cutting and forming apparatus for elbow duct manufacturing machine, that is capable of improving the cutting quality of the duct and the forming quality of the duct wing while also reducing the processing time.

Further, another purpose of the present disclosure is to provide a duct cutting and forming apparatus for elbow duct manufacturing machine, that is capable of easily adjusting the extrusion length of the cutting roller and the forming roller.

Further, another purpose of the present disclosure is to provide a duct cutting and forming apparatus for elbow duct manufacturing machine, that is capable of securing the cutting and forming quality while also reducing the restoration time so that the production speed of a product can be improved, by setting the extrusion speed of the cutting roller and the forming roller to be the optimal speed for the cutting and forming of the duct, and setting the restoration speed of the cutting roller and the forming roller to be relatively fast.

The aforementioned purposes are achieved by a duct cutting and forming apparatus for elbow duct manufacturing machine, the apparatus including a rotation housing that is provided with a seating groove in a first direction; an eccentric housing that is provided with a cutting roller and a forming roller at both ends, and that is slidably seated inside the seating groove; a rotation drive for applying rotation driving force to the rotation housing; and an eccentric drive for applying driving force for reciprocating the eccentric housing, wherein the eccentric drive is configured to reciprocate the eccentric housing as the eccentric drive rotates in both directions within a range not exceeding 180 degrees.

Here, the number of times the eccentric housing reciprocates is preferably set to exceed the number of times the rotation housing rotates, during one cycle of process of completely cutting and forming the duct.

Further, it is preferable that the eccentric drive adjusts the number of times of rotation in a forward direction and a reverse direction, to control an extrusion length of the cutting roller or the forming roller.

Further, it is preferable that the eccentric drive is set such that a rotation speed in a restoration area of the cutting roller or the forming roller is relatively higher that a rotation speed in an extrusion area of the cutting roller or the forming roller.

Further, it is preferable that the rotation drive includes a first rotation axis that has an axis hole formed through its center and that is connected to the rotation housing; a second rotation axis that is arranged parallel with the first rotation axis; a first gear and a second gear, that connect the first rotation axis and the second rotation axis; and a first driving axis that provides rotation driving force to the second rotation axis as the first driving axis is rotated by a first driving motor.

Further, it is preferable that the second rotation axis is arranged with an inclination, and is connected with the first driving axis by a first joint.

Further, it is preferable that the eccentric drive includes a third rotation axis that is axially rotatably inserted into the axis hole; and a second driving axis that provides driving force for a rotation in a forward direction and a reverse direction of the third rotation axis as the second driving axis is rotated by a second driving motor.

Further, it is preferable that the eccentric housing is provided with a guiding groove having the shape of an elongated hole extending in a second direction intersecting the first direction, and a tip of the third rotation axis is provided with an eccentric projection that is inserted into the guiding groove at a position eccentric from a rotation center.

Further, it is preferable that the third rotation axis is arranged with an inclination, and is connected with the second driving axis by a second joint.

According to the present disclosure, a duct cutting and forming apparatus for elbow duct manufacturing machine, that is capable of improving the cutting quality of the duct and the forming quality of the duct wing while also reducing the processing time, is provided.

Further, a duct cutting and forming apparatus for elbow duct manufacturing machine, that is capable of easily adjusting the extrusion length of the cutting roller and the forming roller, is provided.

Further, a duct cutting and forming apparatus for elbow duct manufacturing machine, that is capable of securing the cutting and forming quality while also reducing the restoration time so that the production speed of a product can be improved, by setting the extrusion speed of the cutting roller and the forming roller to be the optimal speed for cutting and forming of the duct, and setting the restoration speed of the cutting roller and the forming roller to be relatively fast, is provided.

REFERENCE NUMERALS

Figure 1:
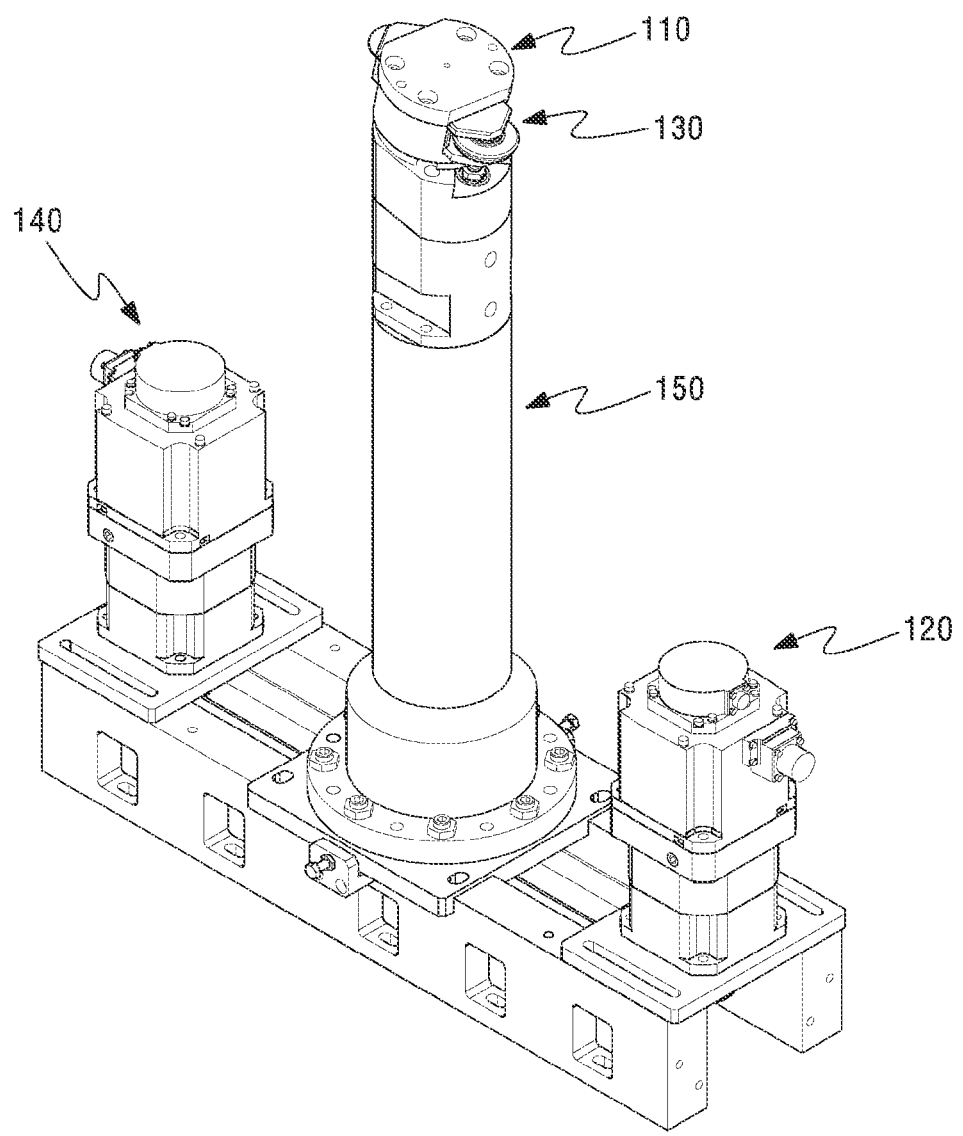
FIG. 1 is a perspective view of a duct cutting and forming apparatus for elbow duct manufacturing machine of the present disclosure.

110: ROTATION HOUSING, 111: DISC-SHAPED BODY, 112: SEATING GROOVE, 113: THROUGH HOLE, 114: FIRST COVER, 120: ROTATION DRIVE, 121: FIRST ROTATION AXIS, 121A: SLEEVE, 121B: COUPLING FLANGE, 122: SECOND ROTATION AXIS, 123: FIRST GEAR, 124: SECOND GEAR, 125: FIRST DRIVING AXIS, 126: FIRST JOINT, 127: FIRST DRIVING MOTOR, 130: ECCENTRIC HOUSING, 131: MOVING BODY, 131A: GUIDING GROOVE, 132: CUTTING ROLLER, 133: FORMING ROLLER, 134: SECOND COVER, 140: ECCENTRIC DRIVE, 141: THIRD ROTATION AXIS, 141A: ECCENTRIC PROJECTION, 142: SECOND DRIVING AXIS, 143: SECOND DRIVING MOTOR, 144: SECOND JOINT, 150: BASE, D: DUCT, J: FORMING JIG

DESCRIPTION OF SPECIFIC EMBODIMENTS OF THE INVENTION

Prior to the description, in various embodiments, components having the same configuration will be representatively described in the first embodiment using the same reference numerals, and in other embodiments, configurations that are different from the first embodiment will be described.

Hereinbelow, a duct cutting and forming apparatus for elbow duct manufacturing machine according to the first embodiment of the present disclosure will be described in detail with reference to the drawings attached.

Figure 2:
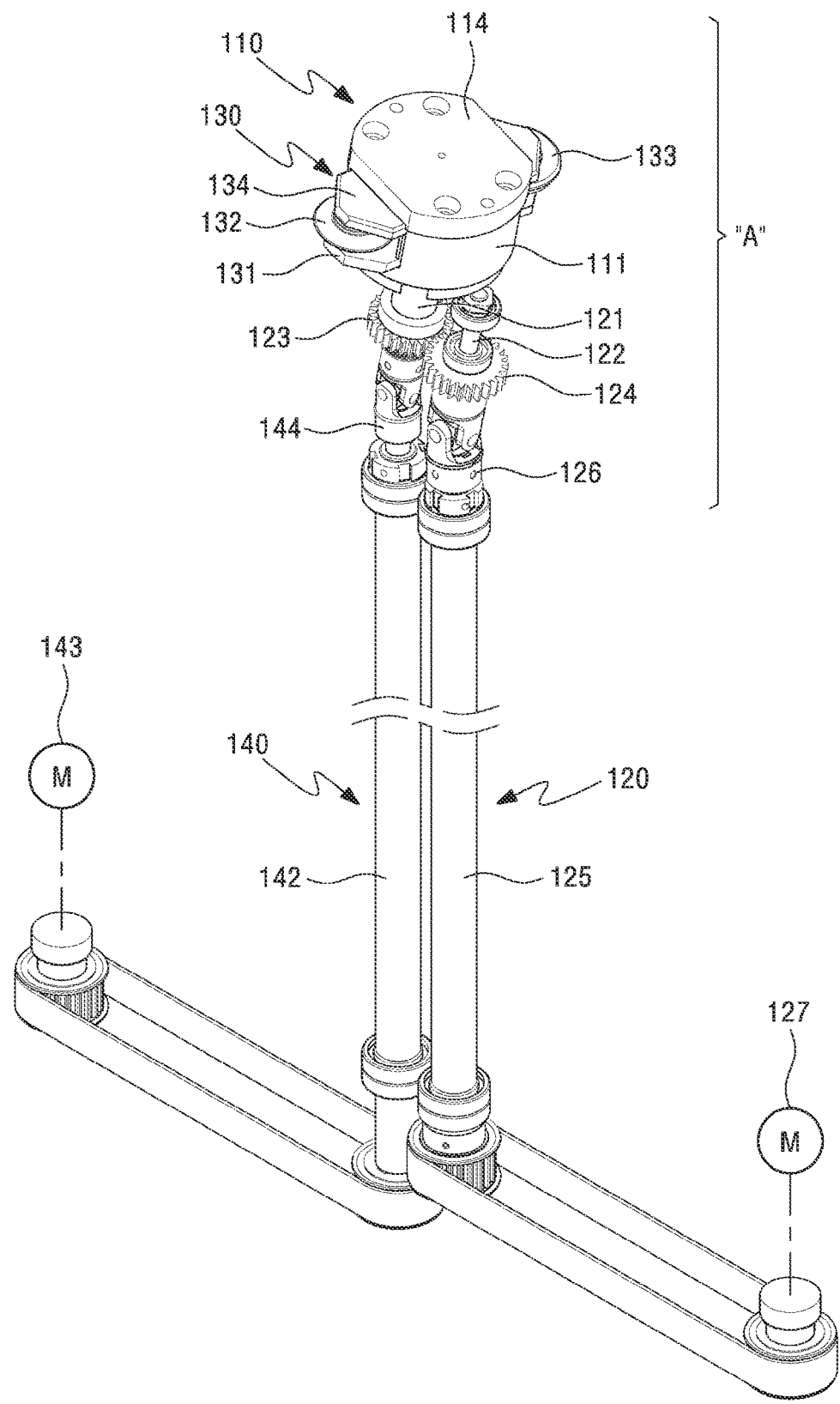
FIG. 2 is an excerpt perspective view illustrating the main configuration of the duct cutting and forming apparatus for elbow duct manufacturing machine of the present disclosure.
Figure 3:
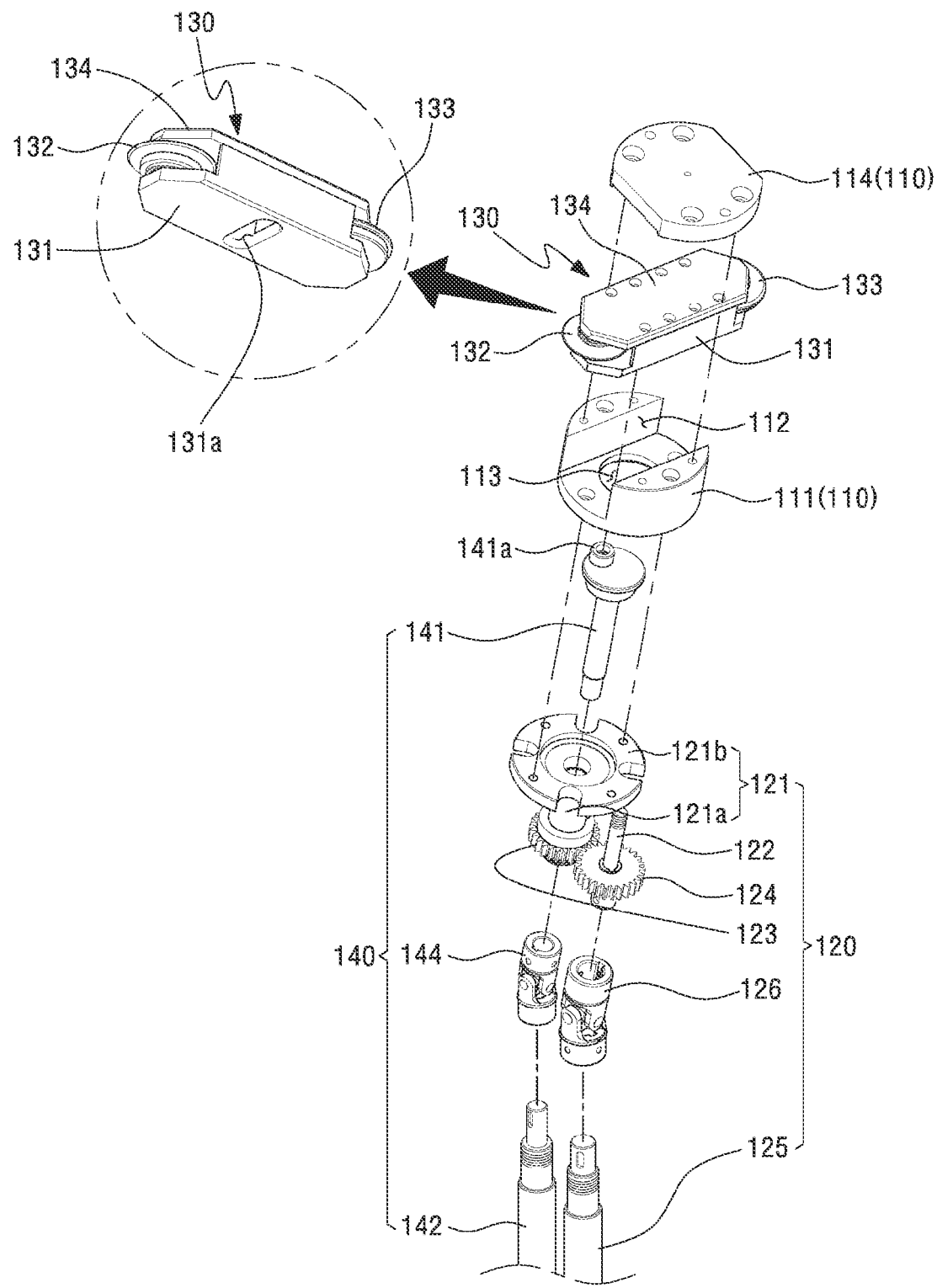
FIG. 3 is an exploded perspective view of "A" part of FIG. 2.

Of the drawings attached, FIG. 1 is a perspective view of a duct cutting and forming apparatus for elbow duct manufacturing machine of the present disclosure, FIG. 2 is an excerpt perspective view illustrating the main configuration of the duct cutting and forming apparatus for elbow duct manufacturing machine of the present disclosure, and FIG. 3 is an exploded perspective view of "A" part of FIG. 2.

The duct cutting and forming apparatus for elbow duct manufacturing machine as illustrated in the aforementioned drawings is for substituting the rotation drive of the equipment for manufacturing an elbow-type duct disclosed in Patent Literature 1 (Korean Publication Gazette No. 10-1616041), and includes a rotation housing 110, a rotation drive 120, an eccentric housing 130, and an eccentric drive 140.

The rotation housing 110 includes a disc-shaped body 111 having a diameter that can be inserted inside a duct D, a seating groove 112 that is recessed from a top surface of the disc-shaped body 111 to guide a reciprocation movement of the eccentric housing 130 in a first direction, a through hole 113 that is formed through a bottom surface of the disc-shaped body 111 to communicate with the seating groove 112, and a first cover 114 assembled on the top surface of the disc-shaped body 111 to close an upper opening of the seating groove 112.

Such a rotation housing 110 is arranged with an inclination with respect to a vertical axis in order to manufacture the elbow shaped duct, so that one side of the duct D is cut to have a narrow width, and the other side of the duct D is cut to have a wide width.

The rotation drive 120 is for applying rotation drive force for an axial rotation of the rotation housing 110. The rotation drive 120 includes a first rotation axis 121 that is provided with a hollow sleeve 121a through which an axis hole is formed in a longitudinal direction, and a coupling flange 121b connected to the rotation housing 110, and that is arranged with an inclination with respect to the vertical axis at the same angle as the rotation housing 110; a second rotation axis 122 that is arranged with an inclination parallel with the first rotation axis 121; a first gear 123 and a second gear 124, that connect the first rotation axis 121 and the second rotation axis 122; a first driving axis 125 that is disposed below the second rotation axis 122 in a vertical direction, and that is rotated by a first driving motor 127, and a first joint 126 that has a universal joint form, and that connects the first driving axis 125 and the second rotation axis 122, to transfer rotation force of the first driving axis 125 to the second rotation axis 122. Here, the first driving motor 127 is preferably configured to control the rotation speed and the number of times of rotations like a servo motor, and a reduction mechanism may be added between the first driving motor 137 and the first driving axis 125.

The eccentric housing 130 includes a moving body 131 provided with a guiding groove 131a having the shape of an elongated hole extending in a second direction intersecting the first direction, formed at a position corresponding to the through hole 113 of the rotation housing 110, and the moving body 131 being seated inside the seating groove 112 of the rotation housing 110 such that it is slidable in the first direction. The eccentric housing 130 further includes a cutting roller 132 rotatably connected to one end of the moving body 131, a forming roller 133 rotatably connected to the other end of the moving body 131, and a second cover 134 that is assembled on a top surface of the moving body 131 to prevent separation of the cutting roller 132 and the forming roller 133.

The eccentric drive 140 is for applying driving force for reciprocating the eccentric housing 130, and the eccentric drive 140 includes a third rotation axis 141 that is disposed on the same axis line as the first rotation axis 121, and that is axially rotatably inserted into the axis hole of the first rotation axis 121, an eccentric projection 141a that is disposed at an eccentric position from a rotation center of a tip of the third rotation axis 141 and that is inserted into the guiding groove 131a, a second driving axis 142 that axially rotates in a forward direction and a reverse direction as it is rotated by a second driving motor 143, and a second joint 144 that has the shape of a universal joint, and that connects the second driving axis 142 and the third rotation axis 141 to transfer forward direction and reverse direction rotation force applied through the second driving axis 142 to the third rotation axis 141. Here, the second driving motor 143 is preferably configured to control the rotation speed and the number of times of rotations like a servo motor, and a reduction mechanism may be added between the second driving motor 143 and the second driving axis 142.

In addition, while the rotation housing 110 rotates, the cutting roller 132 and the forming roller 133 of the eccentric housing 130 contact the duct D as they move, and here the contacting part must gradually move along a circumference of the duct D. For this purpose, the number of times of reciprocations of the eccentric housing 130 is set to exceed the number of times of rotations of the second driving motor 143. For example, in a case where the rotation housing 110 of the rotation drive 120 rotates thirty times while performing one cycle process of completely cutting and forming the duct D, the eccentric housing 130 of the eccentric drive 140 may be set to perform thirty-one times of reciprocation strokes. That is, since the reciprocation stroke cycle of the eccentric housing 130 is faster than the rotation cycle of the rotation housing 110, when the rotation housing 110 rotated 360 degrees, the cutting roller 132 and the forming roller 133 of the eccentric housing 130 will be in contact with the duct D at a position where the rotation housing 110 rotated slightly less than one rotation, and thus while the rotation of the rotation housing 110 is in progress, the contact position will gradually move.

In addition, the second driving motor 143 can be controlled to rotate in both directions within a range of the third rotation axis 141 not exceeding 180 degrees, and by adjusting the forward direction and reverse direction rotation angle of the third rotation axis 141, the extrusion length of the cutting roller 132 or the forming roller 133 can be controlled. Here, since the extrusion length of the cutting roller 132 and the forming roller 133 can be controlled by adjusting the rotation angle of the third rotation axis 141, it is possible to easily change the cutting and forming conditions depending on the material or thickness of the duct D or working environment by controlling the second driving motor 143. Not only that, in order to improve the processing speed of the second driving motor 143, it is preferable to set the rotation speed of the third rotation axis 131 in the restoration area of the cutting roller 132 and the forming roller 133 to be relatively faster than the rotation speed of the third rotation axis 131 in the extrusion area of the cutting roller 132 and the forming roller 133.

Meanwhile, the rotation drive 120 and the eccentric drive 140 may be supported on a base 150 having the form of a cylindrical column. An outer diameter of the base 150 may be set to be insertable into the inside of the duct D that is to be formed, and a plurality of bearings may be provided inside the base 150 such that each of the first driving axis 125, the second driving axis 142, the first rotation axis 121 and the second rotation axis 122 may be supported in an axially rotatable state.

Hereinafter, an operation of a first embodiment of the aforementioned duct cutting and forming apparatus for elbow duct manufacturing machine will be described.

Figure 4:
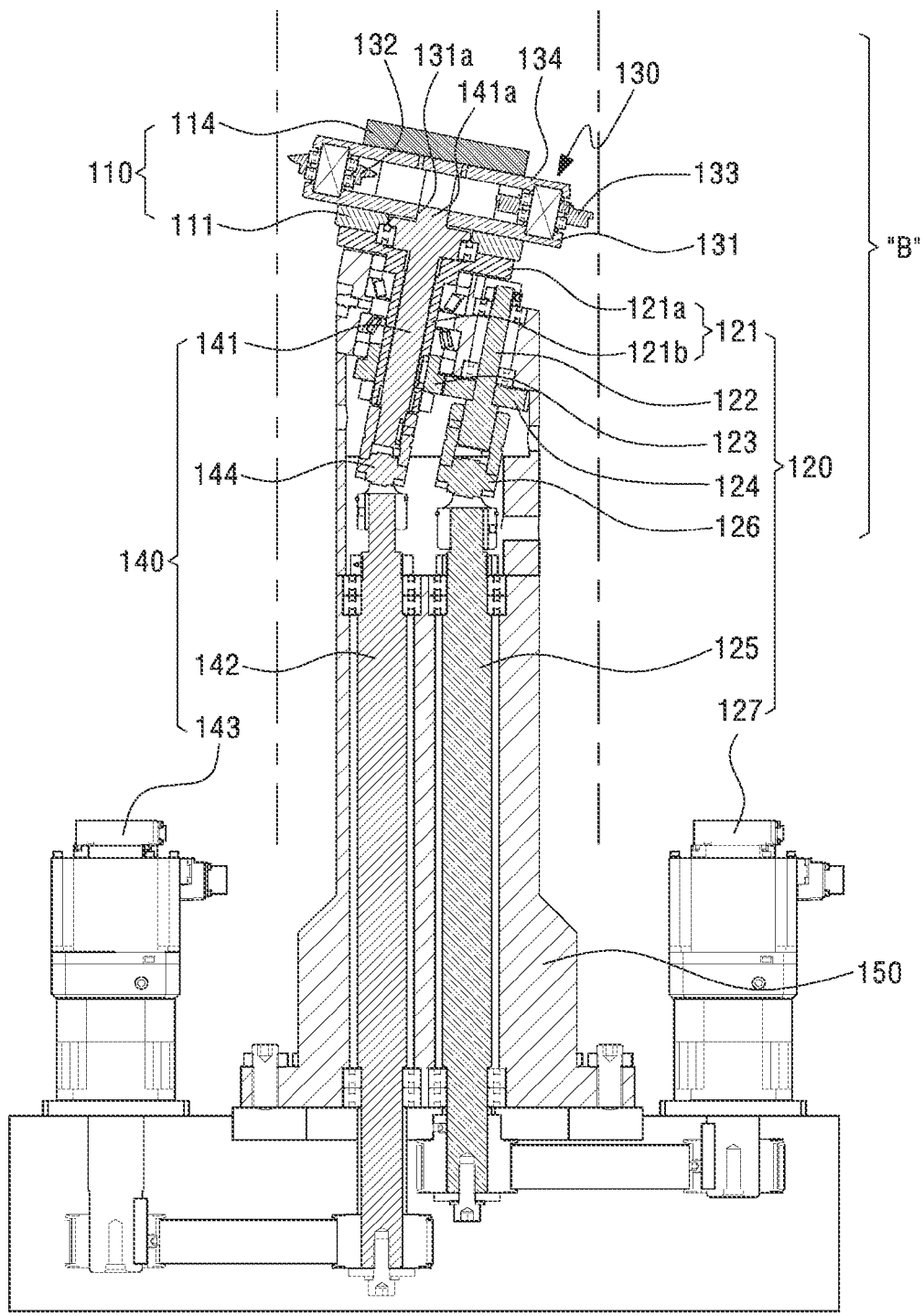
FIG. 4 is a front view of the duct cutting and forming apparatus for elbow duct manufacturing machine of the present disclosure.
Figure 5:
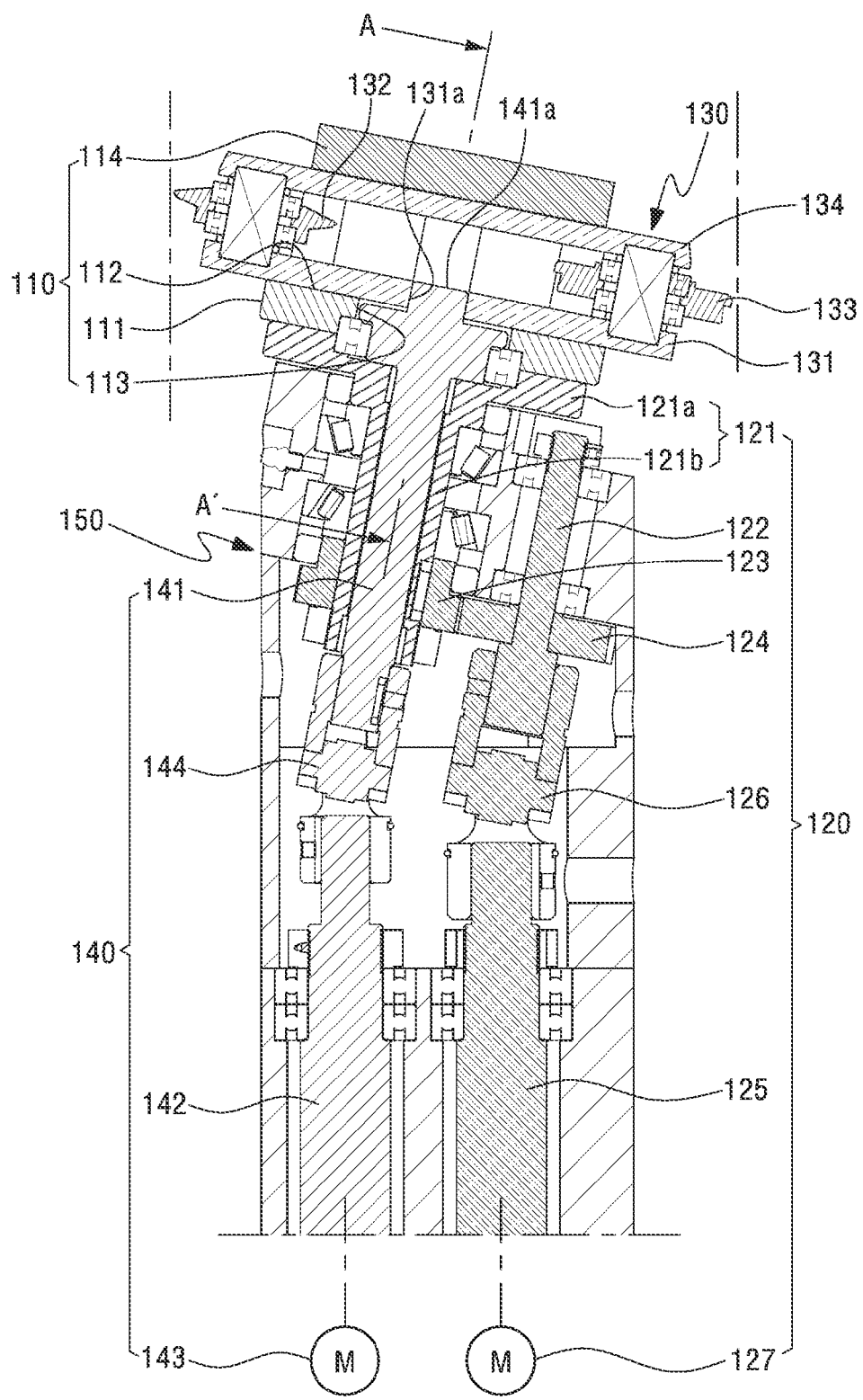
FIG. 5 is an enlarged cross-sectional view of "B" part of FIG. 4.
Figure 6:
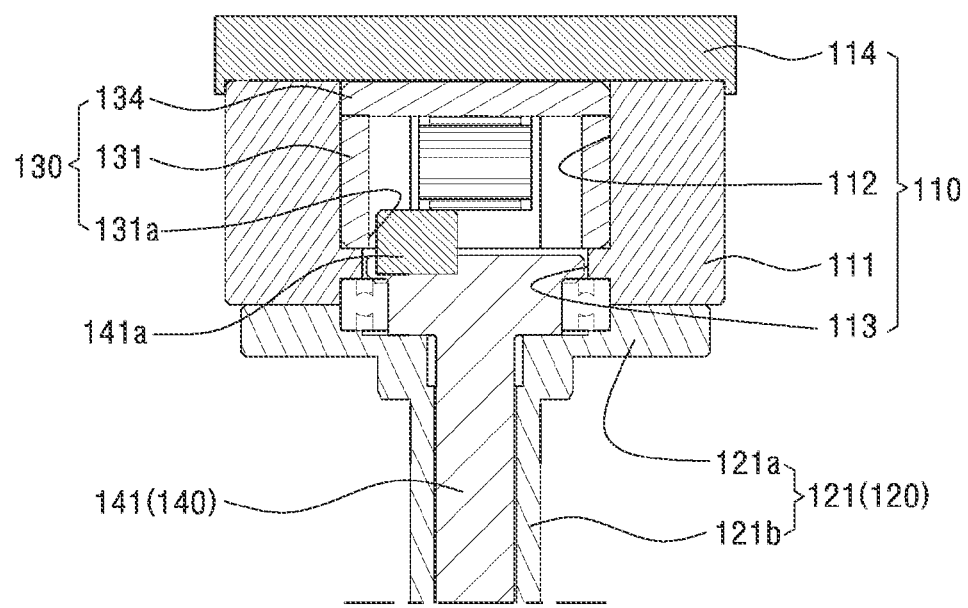
FIG. 6 is a cross-sectional view cut along line A-A' of FIG. 5.
Figure 7:
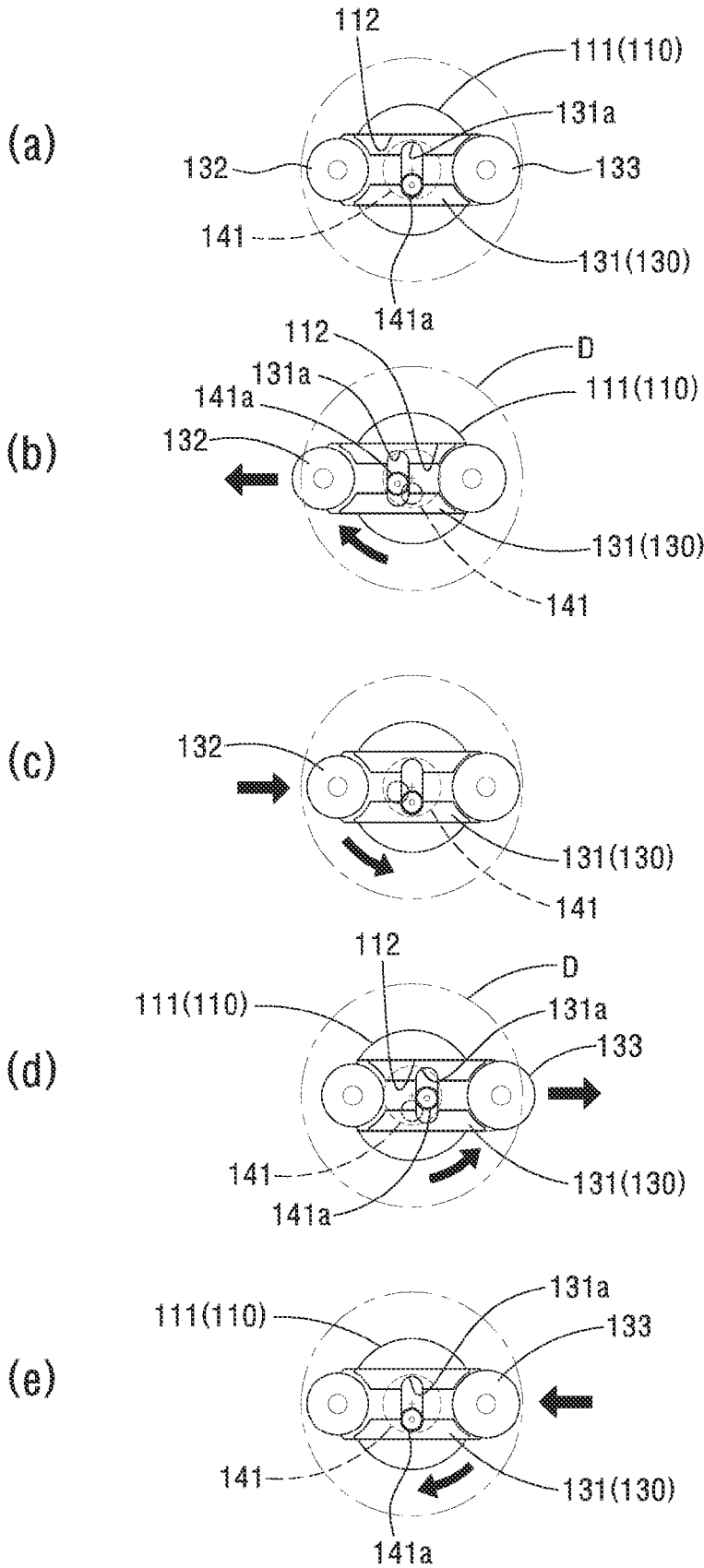
FIG. 7 is an action view of each rotation step of an eccentric housing according to the duct cutting and forming apparatus for elbow duct manufacturing machine of the present disclosure.
Figure 8:
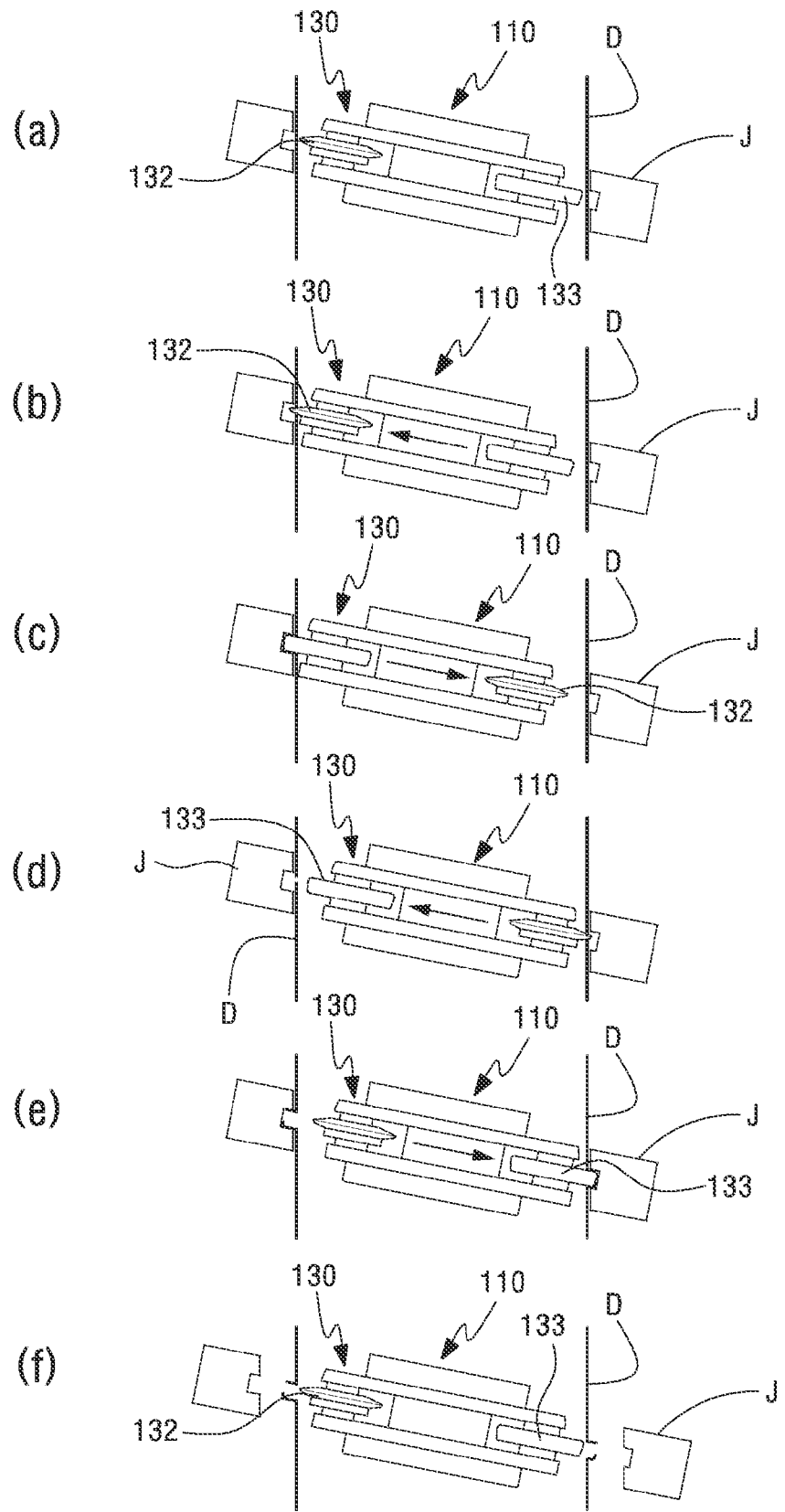
FIG. 8 is an action view illustrating the duct cutting and forming process according to the duct cutting and forming apparatus for elbow duct manufacturing machine of the present disclosure.

Of the attached drawings, FIG. 4 is a front view of the duct cutting and forming apparatus for elbow duct manufacturing machine of the present disclosure, FIG. 5 is an enlarged cross-sectional view of "B" part of FIG. 4, FIG. 6 is a cross-sectional view cut along line A-A' of FIG. 5, FIG. 7 is an action view of each rotation step of an eccentric housing according to the duct cutting and forming apparatus for elbow duct manufacturing machine of the present disclosure, and FIG. 8 is an action view illustrating the duct cutting and forming process according to the duct cutting and forming apparatus for elbow duct manufacturing machine of the present disclosure.

As illustrated in FIGS. 4 to 6, the first driving axis 125 of the rotation drive 120 and the second driving axis 142 of the eccentric drive 140 are each supported such that they are axially rotatable in a state where they are arranged inside the base 150 in a vertical direction, and a lower end of the first driving axis 125 is connected with the first driving motor 127, and a lower end of the second driving axis 142 is connected with the second driving motor 143.

The second rotation axis 122 of the rotation drive 120 is rotatably supported in a state where it is arranged with an inclination with respect to the vertical direction at a certain angle in an upper area of the first driving axis 125 of the inner space of the base 150, and a lower end of the second rotation axis 122 is connected with the first driving axis 125 through the first joint 126 so that the second rotations axis 122 can rotate with the rotation force received from the first driving axis 125.

The first rotation axis 121 of the rotation drive 120 is rotatably supported in a state where it is arranged with an inclination in parallel with the second rotation axis 122 in an upper area of the second driving axis 142 of the inner space of the base 150, and is connected with the second rotation axis 122 through the first gear 123 and the second gear 124, that are fixed to the first rotation axis 121 and the second rotation axis 122, respectively, and that are interlocked to each other.

The coupling flange 121b that is provided above the sleeve 121a of the first rotation axis 121 is exposed to an upper side of the base 150, and the disc-shaped body 111 of the rotation housing 110 is fixed to the coupling flange 121b, and rotates together with the first rotation axis 121 in a state where it is arranged with an inclination with respect to the vertical axis at a certain angle.

The third rotation axis 141 of the eccentric drive 140 is supported such that it is axially rotatable on an axis hole of the sleeve 121a provided below the coupling flange 121b of the first rotation axis 121, and a lower end of the third rotation axis 141 is connected with the second driving axis 142 through the second joint 144 so that it can rotate with the rotation force received from the second driving axis 142.

The eccentric projection 141a provided at a tip of the third rotation axis 141 extrudes to the inside of the seating groove 112 via the through hole 113 of the disc-shaped body 111.

The moving body 131 of the eccentric housing 130 is inserted to the inside of the seating groove 112 such that it is slidable in the first direction along the seating groove 112 that is recessed from an upper side of the disc-shaped body 111, and the eccentric projection 141a of the third rotation axis 141 is inserted into the guiding groove 131a having the shape of an elongated hole extending in the second direction below the moving body 131.

That is, sliding of the moving body 131 is guided in the first direction within the seating groove 112 of the disc-shaped body 111, and as the eccentric projection 141a of the third rotation axis 141 is inserted into the guiding groove 131a extending in the second direction, by the rotation of the third rotation axis 141, reciprocating movement is made in the first direction within the seating groove 112.

Here, the moving distance of the moving body 131 in the first direction is determined according to the moving distance of the eccentric projection 141a in the first direction, and thus the reciprocation stroke length of the moving body 131 can be adjusted by controlling the rotation direction and number of times of rotation of the second driving motor 143 that transfers the rotation driving force to the third rotation axis 141.

Meanwhile, the second driving motor 143 is controlled such that the third rotation axis 141 reciprocates the eccentric housing 130 while rotating in both directions within a range not exceeding 180 degrees.

That is, as in (a) of FIG. 7, in a state where the eccentric projection 141a of the third rotation axis 141 is positioned at a reference point, that is, in a state where the moving body 131 of the eccentric housing 130 is positioned at the center of the seating groove 112 of the disc-shaped body 111 and the cutting roller 132 and the forming roller 133 are not extruded, if the third rotation axis 131 rotates approximately 70 degrees in a clockwise direction as in (b) of FIG. 7, as the eccentric projection 141a inserted into the guiding groove 131a rotates in one direction, the moving body 131 of the eccentric housing 130 will move in one direction within the seating groove 112 of the disc-shaped body 111, and thus the cutting roller 132 will be extruded. When the cutting roller 132 is extruded as aforementioned, the duct D part that is in contact with the cutting roller 132 will be cut, thereby separating it into an upper and lower duct D.

In addition, if the third rotation axis 141 rotates approximately 70 degrees in a counterclockwise direction as in (c) of FIG. 7, the cutting roller 132 will restore back to its original place together with the moving body 131 of the eccentric housing 130, and if the third rotation axis 141 rotates approximately 80 degrees in a counterclockwise direction as in (d) of FIG. 7, as the eccentric projection 141a inserted into the guiding groove 131a rotates in the other side direction, the moving body 131 of the eccentric housing 130 will move to the other side direction within the seating groove 112, and thus the forming roller 133 will be extruded. As aforementioned, if the forming roller 133 is extruded, the cutting part of the duct D that is in contact with the forming roller 133 will be bent, and thus a duct wing will be formed.

Meanwhile, after the duct wing is formed, if the third rotation axis 141 rotates approximately 80 degrees in a clockwise direction as in (d) of FIG. 7, the forming roller 133 will restore back to its original place together with the moving body 131 of the eccentric housing 130.

According to the aforementioned present embodiment, as the third rotation axis 141 rotates in a forward direction and reverse direction within a range not exceeding 180 degrees, extrusion and restoration of the cutting roller 132 and the forming roller 133 will be performed. In the case where the third rotation axis 141 rotates in both directions within a range not exceeding 180 degrees as aforementioned, unnecessary rotation areas as in prior art can be removed, thereby improving the production speed of a product.

Further, since it is possible to control the number of times of rotation of the second driving motor 143 and adjust the rotation angle of the third rotation axis 141 in the forward and reverse direction, the reciprocation stroke length of the eccentric housing 130 can be easily adjusted, and accordingly, there is no need for overstroke setting as in prior art, and thus it is possible to improve the production speed and easily change the cutting and forming conditions depending on the material or thickness of the duct D or working environment.

Not only that, it is possible to control the rotation speed of the second driving motor 143 and set the rotation speed in the restoration area of the cutting roller 132 or the forming roller 133 to be relatively higher than the rotation speed in the extrusion area of the cutting roller 132 or the forming roller 133. That is, by setting the extrusion speed of the cutting roller 132 and the forming roller 133 to the optimal speed for cutting and forming the duct D, and setting the restoration speed of the cutting roller 132 and the forming roller 133 to a relatively faster speed, it is possible to secure the cutting and forming quality while reducing the restoration time, thereby improving the production speed of the product.

Meanwhile, one cycle of process for completely cutting and forming the duct D through the aforementioned present embodiment is described as follows.

First, as in (a) of FIG. 8, in a state where the cutting roller 132 and the forming roller 133 are not extruded, the duct D is fitted from outside of the rotation housing 110, and a forming jig J for supporting the duct D in a position corresponding to the cutting roller 132 and the forming roller 133 is arranged outside of the duct D.

Next, as in (b) of FIG. 8, after the cutting roller 132 of the eccentric housing 130 extrudes, and contacts and cuts the duct D, the eccentric housing 130 will rotate 180 degrees together with the rotation housing 110 as in (c) of FIG. 8, so that the forming roller 133 hits the cutting part of the duct D, thereby forming the duct wing.

When the eccentric housing 130 is driven by the eccentric drive 140 to make a reciprocation movement as aforementioned, the cutting roller 132 and the forming roller 133 provided in the eccentric housing 130 will cut and form the duct D as they extrude sequentially. Here, as the rotation housing 110, on which the eccentric housing 130 is seated, rotates, the cutting roller 132 and the forming roller 133 will rotate together with the rotation housing 110. Since the reciprocation cycle of the eccentric housing 130 is set to be relatively faster than the rotation cycle of the rotation housing 110, as the part that the cutting roller 132 and the forming roller 133 cut and form in the duct D gradually moves, the duct D having the cylindrical shape gets cut and formed.

That is, after cutting and forming one area of the duct D as in (b) and (c) of FIG. 8 and then cutting and forming another area of the duct D as in (d) and (e) of FIG. 8, the cylindrical duct D can be completely cut while forming the duct wing at the cut part at the same time.

Especially, as aforementioned, by the reciprocation movement of the eccentric housing, each of the cutting roller and the forming roller extrudes and restores, thereby cutting and forming the duct, and here, by setting the extruding speed of the cutting roller 132 and the forming roller 133 to be the optimal speed for cutting and forming the duct D, and setting the restoring speed of the cutting roller 132 and the forming roller 133 to a relatively faster speed, it is possible to secure the cutting and forming quality while reducing the restoring time, thereby improving the production speed of the product.

Next, when the cutting and forming of the duct D is completed, the forming jig G can be moved away from the duct D, and then the duct D at the upper side can be rotated 180 degrees, and the duct wing can be bent, and then a process of fixating the upper side duct and the lower side duct can be performed, thereby manufacturing the elbow type duct. Since this subsequent process if disclosed in Patent Literature 1 (Korean Publication Gazette No. 10-1616041), detailed description thereof will be omitted.

The scope of right of the present disclosure is not limited to the aforementioned embodiment, but may be implemented in various forms of embodiments within the attached scope of the claims. Without departing from the gist of the present disclosure claimed in the claims, it is considered to be within the scope of the claims of the present disclosure to various extents that can be modified by any person skilled in the art to which the present disclosure pertains.

What is claimed is:

1. A duct cutting and forming apparatus for elbow duct manufacturing machine, the apparatus comprising:
   a rotation housing that is provided with a seating groove in a first direction;
   an eccentric housing that is provided with a cutting roller and a forming roller at both ends of the eccentric housing, and that is slidably seated inside the seating groove;
   a rotation drive for applying rotation driving force to the rotation housing; and
   an eccentric drive for applying driving force for reciprocating the eccentric housing,
   wherein the eccentric drive is configured to reciprocate the eccentric housing as the eccentric drive rotates clockwise and counterclockwise within a range not exceeding 180 degrees;
   wherein the rotation drive comprises a first rotation axis that has an axis hole formed through its center and that is connected to the rotation housing;
   a second rotation axis that is arranged parallel with the first rotation axis;
   a first gear and a second gear, that connect the first rotation axis and the second rotation axis; and
   a first driving axis that provides rotation driving force to the second rotation axis as the first driving axis is rotated by a first driving motor,
   wherein the eccentric drive comprises a third rotation axis that is axially rotatably inserted into the axis hole; and
   a second driving axis that provides driving force for a rotation in a forward direction and a reverse direction of the third rotation axis as the second driving axis is rotated by a second driving motor.

2. The duct cutting and forming apparatus for elbow duct manufacturing machine according to claim 1, wherein a number of times the eccentric housing reciprocates is set to exceed a number of times the rotation housing rotates, during one cycle of process of completely cutting and forming the duct.

3. The duct cutting and forming apparatus for elbow duct manufacturing machine according to claim 1, wherein the eccentric drive adjusts a number of times of rotation in a forward direction and a reverse direction, to control an extrusion length of the cutting roller or the forming roller.

4. The duct cutting and forming apparatus for elbow duct manufacturing machine according to claim 1, wherein the eccentric drive is set such that a rotation speed in a restoration area of the cutting roller or the forming roller is relatively higher that a rotation speed in an extrusion area of the cutting roller or the forming roller.

5. The duct cutting and forming apparatus for elbow duct manufacturing machine according to claim 1, wherein the second rotation axis is arranged with an inclination, and is connected with the first driving axis by a first joint.

6. The duct cutting and forming apparatus for elbow duct manufacturing machine according to claim 1, wherein the eccentric housing is provided with a guiding groove having the shape of an elongated hole extending in a second direction intersecting the first direction, and
   a tip of the third rotation axis is provided with an eccentric projection that is inserted into the guiding groove at a position eccentric from a rotation center.

7. The duct cutting and forming apparatus for elbow duct manufacturing machine according to claim 1, wherein the third rotation axis is arranged with an inclination, and is connected with the second driving axis by a second joint.

* * * * *